M. A. FRIDGEN.
CHAIN FASTENER.
APPLICATION FILED APR. 25, 1921.

1,389,498. Patented Aug. 30, 1921.

Inventor
M. A. Fridgen.
By
Geo. P. Kimmel, Attorney

UNITED STATES PATENT OFFICE.

MICHAEL A. FRIDGEN, OF VINING, MINNESOTA.

CHAIN-FASTENER.

1,389,498.  Specification of Letters Patent.  Patented Aug. 30, 1921.

Application filed April 25, 1921. Serial No. 464,135.

*To all whom it may concern:*

Be it known that I, MICHAEL A. FRIDGEN, a citizen of the United States, residing at Vining, in the county of Otter Tail, in the State of Minnesota, have invented certain new and useful Improvements in a Chain-Fastener, of which the following is a specification.

This invention relates to chain fasteners, more particularly to devices of this character for use in connection with the anti-skid chains for tires of motor driven vehicles, and has for one of its objects to provide a simply constructed device which may be quickly applied or removed and which will not be liable to be accidentally released.

With this and other objects in view, the invention consists in certain novel features of construction as hereinafter shown and described and specifically pointed out in the claim, and in the drawings illustrative of the preferred embodiment of the invention.

Figure 1:
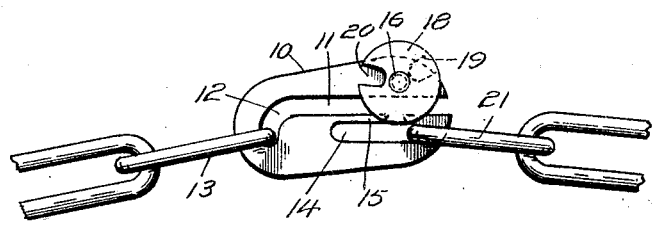
Figure 1 is a side elevation with portions of a chain coupled thereto with the device arranged at "safety."
Figure 2:
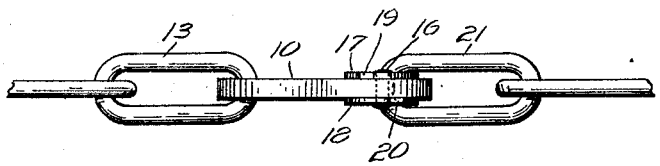
Fig. 2 is a plan view of the parts shown in Fig. 1.

The improved device comprises a link plate represented as a whole at 10, preferably of steel of suitable gage to withstand the strains to which it will be subjected, and formed with a relatively long longitudinally directed slot 11 opening through one end of the plate and extending laterally at the inner end as shown at 12, to form a seat for one of the terminal links 13 of the chain, as shown.

Formed in the body of the link plate 10 is a shorter closed slot 14 having a contracted opening 15 providing communication between the longer and shorter slots.

Pivoted at 16 to the plate 10 preferably at its opposite sides are locking disks 17 and 18 of sufficient size to extend entirely over the inlet 15 to the shorter slot 14.

The disk 17 is formed with a radially directed slot 19 while the disk 18 is provided with a corresponding radial slot 20.

Figures 3, 4:
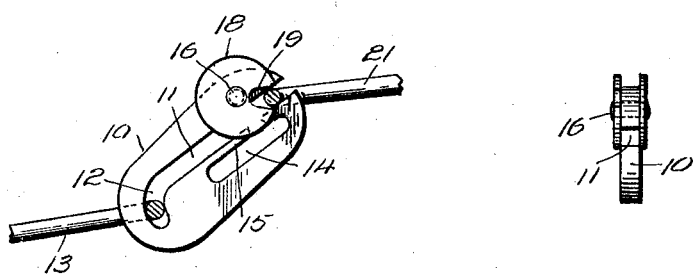
Fig. 3 is a side elevation of one of the improved devices illustrating the manner of inserting and releasing the link of the chain to be held.
Fig. 4 is an end elevation of the device with the parts arranged as in Fig. 1.

By this arrangement when the disks 17 and 18 are turned to dispose the slots 19 and 20 in transverse alinement or in "registration," as shown in Fig. 3, the other terminal link 21 of the chain can be inserted first into the longer slot 11, and then utilized to rotate the disks 17 and 18 on their pivot 16 and carry the bight of the link through the opening 15 into the shorter slot 14. Then by manually continuing the rotation of the disks until the slots 19 and 20 are set to open in different directions as shown in Fig. 1, the link 21 will be effectually locked in position relative to the member 10.

The link 21 cannot be inserted or removed unless the coacting slots 19 and 20 are arranged to register, a position they will not assume of themselves, hence the links form a sure coupling between the terminals of the chain.

The improved device is simple in construction, can be inexpensively manufactured, and will be found to be especially useful for coupling the terminals of non-skid chains on automobiles and other motor driven vehicle tires which may be subjected to very rough use.

With the non-skid chain coupling with the improved fastener the chains will not become detached or loosened except by the breakage of the coupling.

The preferred embodiment of the invention is disclosed in the drawings and set forth in the specification, but it will be understood that modification within the scope of the claimed invention may be made in the construction without departing from the principle of the invention or sacrificing any of its advantages.

What I claim is:—

A chain fastener comprising a link plate having a relatively long longitudinally directed slot opening through one end and a relatively short branching slot closed at the ends and communicating intermediate the ends with the longitudinally directed slot, and coacting locking disks pivoted to the link plate and obstructing the inlet to the branch slot, said disks each having a radially directed slot adapted to provide for the entrance of a chain link into the slots of the link plate when the slots of the locking disks are in registering position.

In testimony whereof I affix my signature hereto.

MICHAEL A. FRIDGEN.